May 15, 1956     H. C. FLINT     2,745,472
ZIGZAG SPRING CUSHION HAVING CENTRAL SUPPORT

Filed Oct. 10, 1951     3 Sheets-Sheet 1

INVENTOR.
Hyland C. Flint.
BY
Harness, Dickey & Pierce.
ATTORNEYS.

May 15, 1956 H. C. FLINT 2,745,472
ZIGZAG SPRING CUSHION HAVING CENTRAL SUPPORT
Filed Oct. 10, 1951 3 Sheets-Sheet 2

INVENTOR.
Hyland C. Flint
BY
Harness, Dickey & Pierce
ATTORNEYS

May 15, 1956        H. C. FLINT        2,745,472
ZIGZAG SPRING CUSHION HAVING CENTRAL SUPPORT
Filed Oct. 10, 1951        3 Sheets-Sheet 3
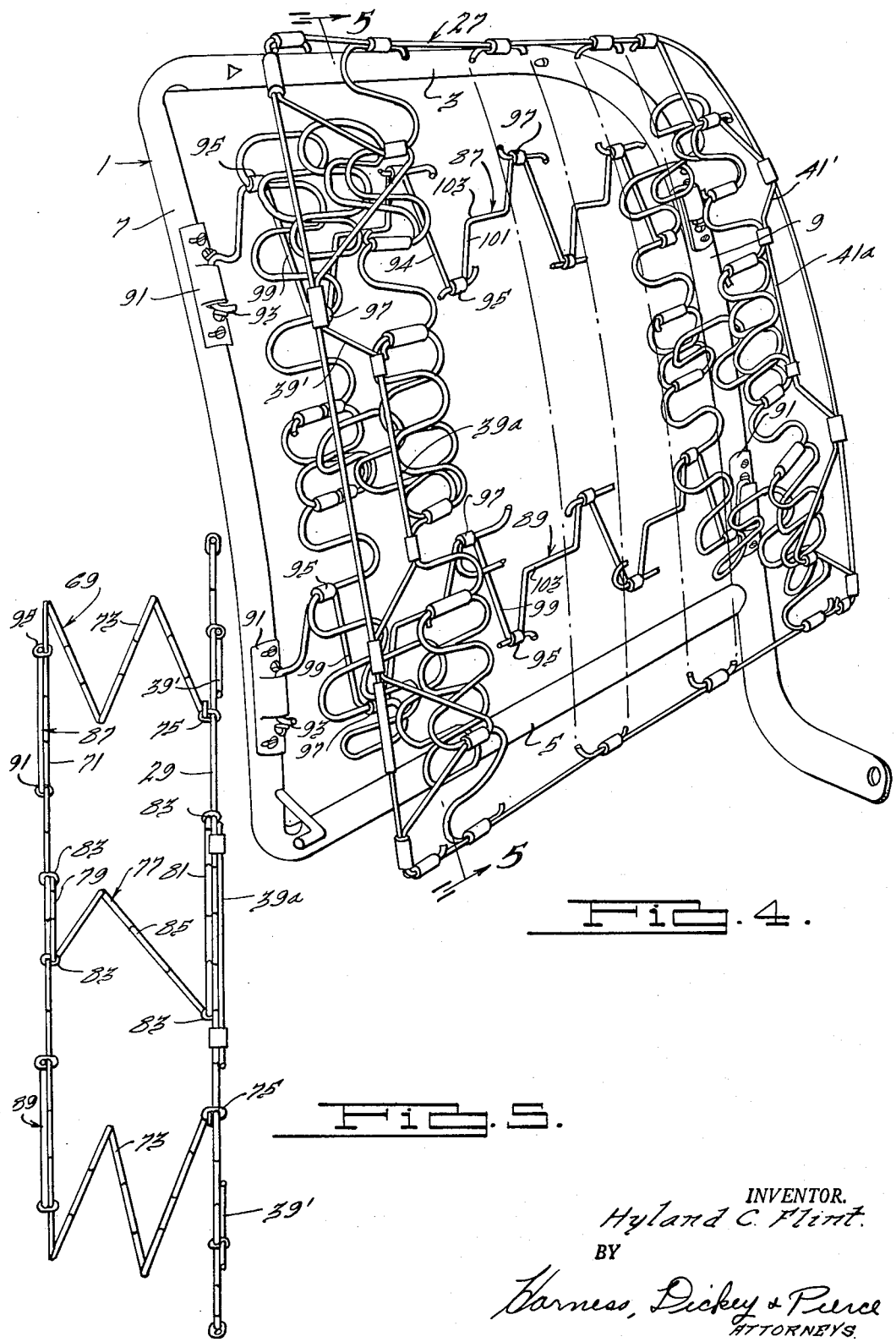
INVENTOR.
Hyland C. Flint.
BY
Harness, Dickey & Pierce
ATTORNEYS 000
United States Patent Office 2,745,472
Patented May 15, 1956

2,745,472

ZIGZAG SPRING CUSHION HAVING CENTRAL SUPPORT

Hyland C. Flint, Birmingham, Mich., assignor to American Metal Products Company, Detroit, Mich., a corporation of Michigan Application October 10, 1951, Serial No. 250,658

5 Claims. (Cl. 155—179)

This invention relates to sinuous spring cushions of the type which are especially but not exclusively adapted for use in automobile seats.

It is an object of the invention to improve the cushioning characteristics of a spring construction embodying sinuous spring strips.

Another object of the invention is to simplify the construction of a sinuous spring cushion and thereby facilitate the manufacture and decrease the cost of the spring cushion.

As is well known, spring cushions utilizing sinuous spring strips are provided with a frame and the sinuous spring strips are mounted on the frame so that they present a series of parallel and transversely spaced web sections which together define the resilient load receiving surface of the cushion. When a cushion is desired which has substantial depth, such as cushions used in the seats and backs of automobile seat constructions, it is customary to mount the resilient surface defined by the web sections of the strip on the frame by means of resilient elements, preferably formed of sinuous spring wire, which are connected between the web sections and the frame unit. In the past, it has been customary to reversely bend the end sections of the sinuous spring strips to serve as elements that provide either part of or the entire resilient mounting for the web sections. Thus, the sinuous spring strips have, in the past, served the joint purpose of providing the resilient cushion surface and of providing a resilient support for the cushion surface.

According to the present invention, the resilient cushion surface is provided by one unit of sinuous spring strips, and these spring strips serve no other purpose. They are mounted on the frame unit by other resilient means preferably a group of sinuous spring strips that are connected between the frame and the unit of strips which provide the resilient surface.

Two forms of the invention are illustrated in the accompanying drawings, and the invention is embodied, for purposes of illustration only, in a back cushion for an automobile seat. From the drawings and the description thereof, various objects and features of the invention will become apparent to those in the art.

In the drawings:

Fig. 3 is a perspective view showing the frame unit and resilient mounting separated from the sinuous spring unit which defines the resilient cushion surface;

Fig. 4 is a perspective view from the front of a modified form of the invention as embodied in an automobile back cushion; and Fig. 5 is a section taken along the line 5—5 of Fig. 4.

Figure 1:
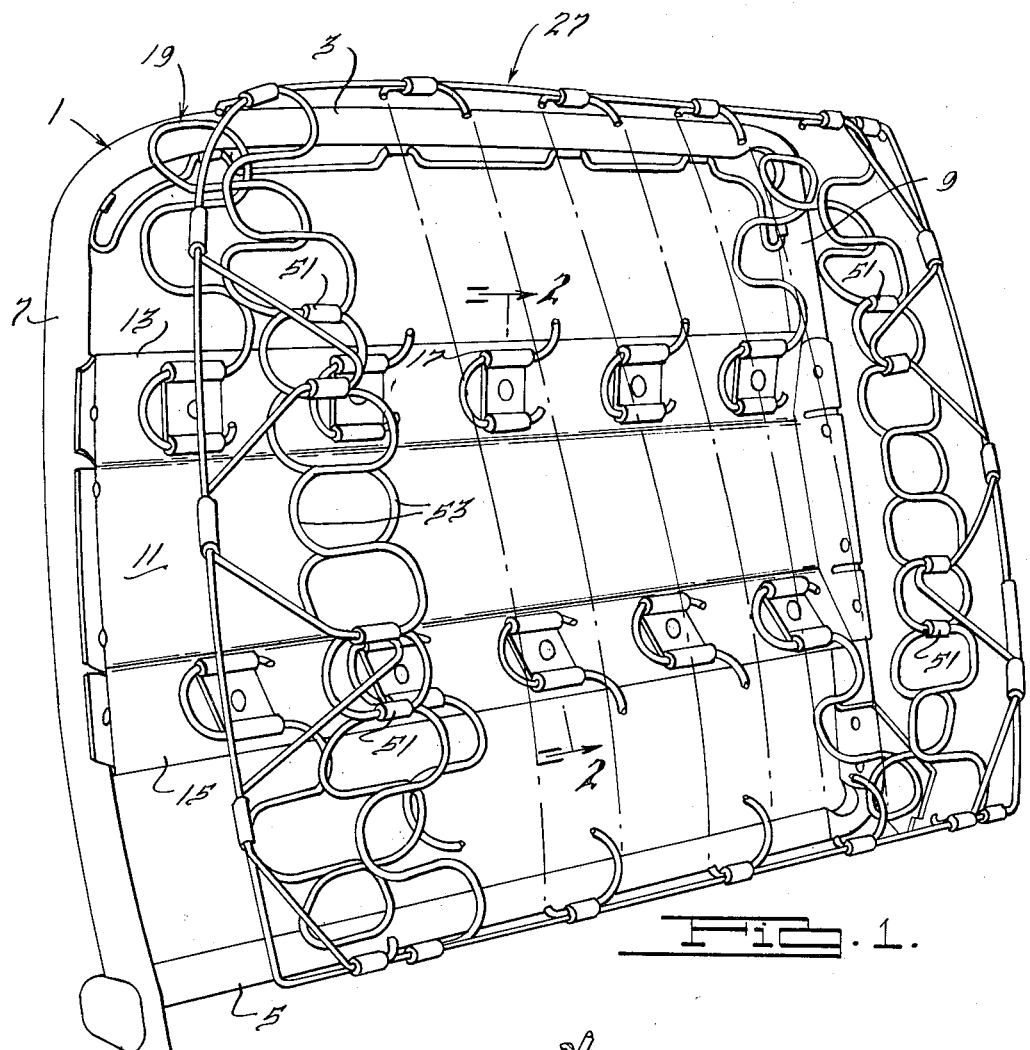
Figure 1 is a perspective view taken from the front of an automobile back cushion, having the upholstery removed, which embodies the present invention.
Figure 2:
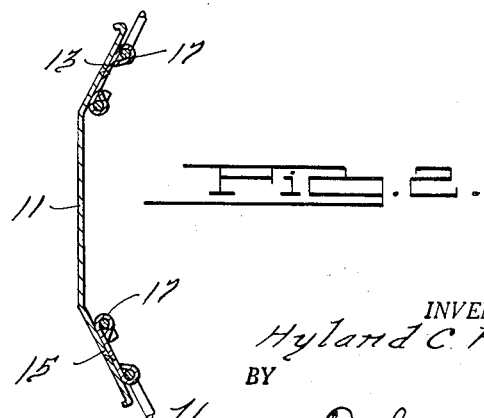
Fig. 2 is a section taken along the line 2—2 of Fig. 1.
Figure 2:
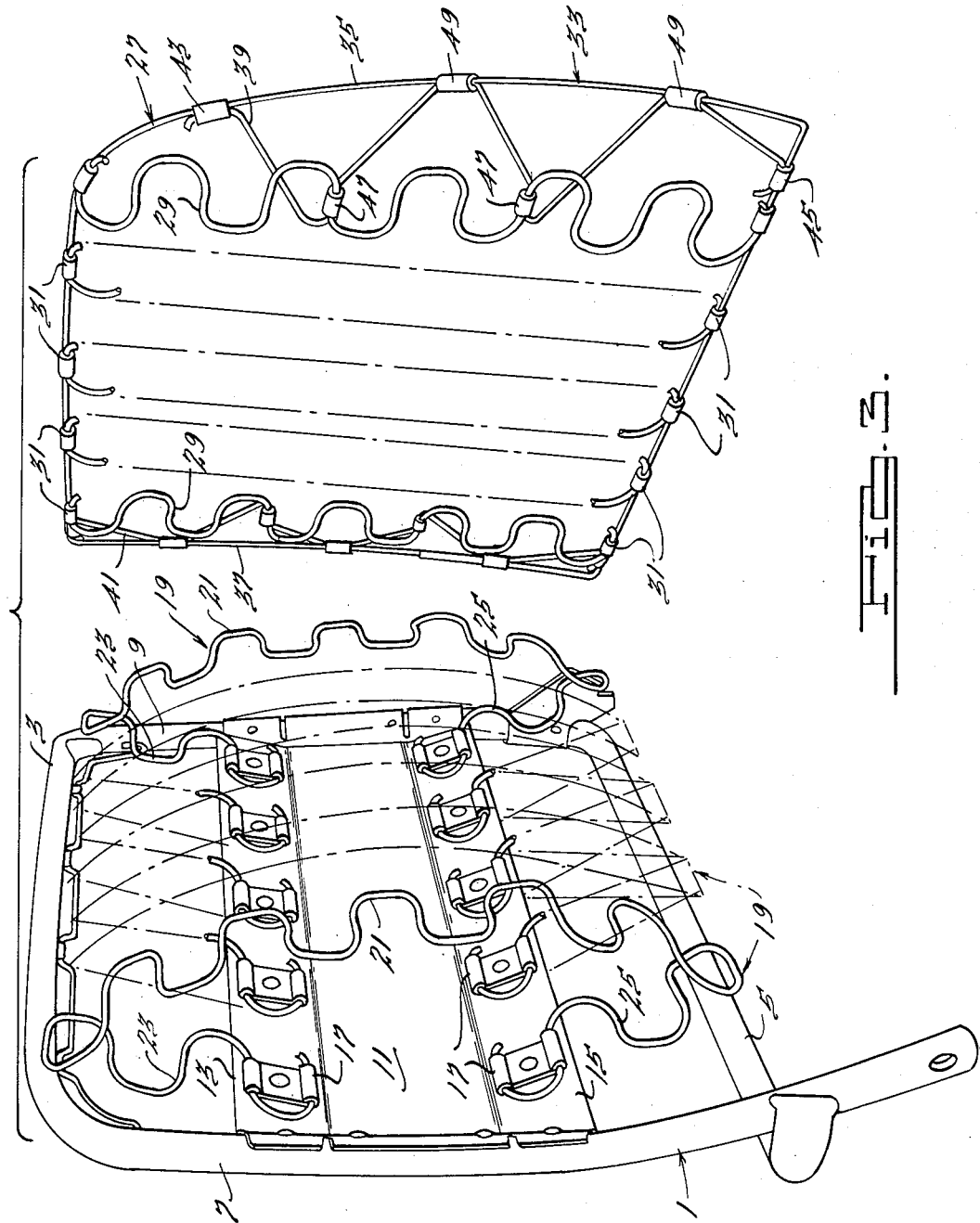

The automobile back cushion shown in Figs. 1–3 has a rigid frame 1 which is formed of metal tubing arranged in rectangular shape to provide top and bottom rails 3 and 5 and outside and inside vertically extending side rails 7 and 9. Intermediate the top and bottom rails 3 and 5 is a sheet metal pan 11 which spans the space between the side rails 7 and 9 and which is riveted, welded, or otherwise affixed to the side rail. The top and bottom edge portions 13 and 15 of the pan 11 are bent on an angle upwardly and outwardly from the bottom of the pan 11 and these edge portions are provided with a series of transversely spaced U-shaped clips 17 that preferably receive one loop of a sinuous spring and serve to anchor it to the pan 11. The upstanding end of the clips are bent over straight sections of the loops of the sinuous wire after being placed within the clips.

Mounted directly on the pan 11 is a series of similar resilient spring strips 19. These spring strips may be of various shapes and their purpose is to support the resilient cushion surface on the frame unit 1. The spring strips illustrated in Figs. 1–3 have convex web sections 21 and top and bottom end portions 23 and 25 which are reversely bent beneath the webs 21 and the end loops thereof inserted in the clips 17 on the top and bottom edge portions 13 and 15, respectively of pan 11. Preferably, the strips 19 are preformed on a relatively large arc in accordance with the disclosure of Kaden Reissue Patent No. 21,263.

The resilient cushion surface is provided by a unit 27 which is made up of a series of parallel sinuous spring strips 29 that are connected by means of clips 31 to a stiff border wire 33 that defines the outer edge of the resilient surface. The marginal strips 29 on the outside and the inside of the unit 27 are connected to the vertically extending side portions 35 and 37 of the border wire 33 by means of stiff wire connectors 39 and 41, respectively. The connector wire 39 has its top end secured to the side 35 of the border wire 33 by a clip 43 and its bottom end secured to the bottom section of the border wire 33 by a clip 45. The intermediate portions of the connector wire 39 are bent back and forth at an angle to the border wire and include sections which are parallel to sections on the marginal spring strip 29 and which are held in tight engagement with the spring strip by means of clips 47. Intermediate portions of the connector wire 39 are secured to the side 35 of the border wire 33 by means of clips 49. The structure of the inside connector 41 is similar to that of the connector 39 just described. However, it is preferably attached at its top end to the top section of the border wire 33 by means of a clip 31 which serves to secure the top edge of the marginal spring 29 to the border wire. The bottom end of the connector 41 may also be connected to the bottom of the border wire 33 by means of a clip 31 that is used to connect the bottom of the marginal strip 29 to the border wire. While the strips 29 are shown as substantially flat it will be evident that they can be shaped otherwise if desired.

The frame unit with the mounting springs 19 thereon forms one sub-assembly in the manufacture of the resilient cushion and the unit 27 forms another sub-assembly. These two units are joined by placing the unit 27 on the web sections 21 of the springs 19. Juxtaposed straight sections of the sinuous strips 29 and 19 are then securely fastened together by means of the clips 51. As seen in Fig. 1, the strips 19 and 29 are preferably arranged so that the bights of their loop sections do not overlie each other but rather face each other as indicated at 53 in Fig. 1. It will be seen that a portion of the cushion intermediate the top and bottom rails 3 and 5 comprises a sinuous strip construction of double thickness due to the superposing of the strip 29 on the central portions of the convex webs 21. Inasmuch as this is the region of maximum load and the region where maximum stiffness is desired, this feature is of practical importance. The ends of the strips 29 project above and below the superposed areas and are spaced from the top and bottom ends of the webs 21. Thus, the ends of the strips 29 present less resistance to deformation and provide soft top and bottom edges and, at the same time, maintain the desired cushion contour.

The principal difference between the embodiment illustrated in Figs. 1–3 and the embodiment illustrated in Figs. 4 and 5 resides in the means for mounting the spring unit 27 on the frame unit 1. In the embodiment of Figs. 4 and 5, the pan 11 is eliminated and sinuous spring mounting strips 69 are used which have flat web sections 71 that are approximately in the plane of the frame 1 and triple reversely bent end portions 73 that are secured by clips 75 to intermediate points on the spring strips 29 of the units 27. At the central point, the web 71 of each sinuous mounting strip 69 is connected to the overlying sinuous strip 29 by a sinuous mounting strip 77. Each strip 77 includes front and rear sections 79 and 81 that are parallel to the corresponding sections of the springs 69 and 29 and attached thereto at opposite ends by the clips 83. A reversely bent section 85 interconnects the portions 79 and 81 of the mounting strip 77.

The resilient mounting strips 69 are mounted on the frame unit 1 by means of stiff transverse wire members 87 and 89 located adjacent the top and bottom edges of the webs 71. The members 87 and 89 are substantially identical and are connected at opposite ends to the side rails 7 and 9 by means of mounting brackets 91 which are suitably affixed to the side rails. The ends of the wires 87 and 89 extend through a suitable aperture in the mounting brackets 91 and are prevented from inadvertent removal by the bent over ends 93 on the wire members. Preferably, the wires are capable of some pivotal movement with respect to the brackets 91. Each of the webs 71 is connected at two points to each of the wires 87 and 89 by clips 95 and 97. The wires 87 and 89 are shaped to have sections which are parallel to straight sections of the loops on the webs 71 and these are spaced preferably three loops apart by the vertically or longitudinally extending sections 99 on the wires 87 and 89. Between adjacent webs 71, the wire members 87 and 89 have sections 101 extending between clips 95 and 97 and the sections 101 preferably include inclined longitudinally extending portions bent on substantially the same angle as the sections 99 and joined at an intermediate point by a transversely extending section 103.

A minor difference between the spring unit 27 of the embodiment of Figs. 4 and 5 resides in the shaping of the connector wires 39' and 41' so that they have intermediate sections 39a and 41a which are parallel to the strips 29.

It will be apparent that the embodiment of Fig. 4 provides a slightly different type of support for the resilient cushion surface of the unit 27. In this embodiment the sections 73 and the resilient mounting 77 support the intermediate areas of the strips 29 but allow the end portions thereof to define a soft top and bottom edge for the cushion.

A significant advantage of the spring construction of this invention is that it enables sinuous spring wire to be used in which the loops are substantially larger than those employed commercially in previous types of automobile spring cushions. This reduces the length of the wire in each sinuous spring strip and thus its weight. As pointed out hereinbefore, the present spring cushion is readily manufactured by mass production techniques and provides the desired localized reinforcements and contour.

I claim:

1. In a spring cushion construction, a base frame having end members joined by side members, a cross member joining said side members interjacent said end members, a series of sinuous springs each having an arched load supporting portion and reversely bent end portions, means for securing said reversely bent end portions in fixed relation to said cross member, a flexible border wire of substantially the shape of said frame member having end portions joined by side portions, a series of sinuous spring strips secured across the end portions of said resilient border wire, said spring strips being aligned with and resting on the spring strips secured to the base frame with the border wire spaced therefrom and substantially aligned therewith, and means for securing the aligned spring strips together in fixed relation to each other.

2. In a spring cushion construction, a base frame having end members joined by side members, a cross member joining said side members interjacent said end members, a series of sinuous springs each having an arched load supporting portion and reversely bent end portions, means for securing said reversely bent end portions in fixed relation to said cross member, a flexible border wire of substantially the shape of said frame member having end portions joined by side portions, a series of sinuous spring strips secured across the end portions of said resilient border wire, said spring strips being aligned with and resting on the spring strips secured to the base frame with the border wire spaced therefrom and substantially aligned therewith, means for securing the aligned spring strips together in fixed relation to each other, and two sinuous spring elements, one secured to each side portion of the border wire and resting upon and secured to the sidemost spring strips of the series which is secured thereto.

3. In a spring cushion construction, a base frame having end members joined by side members, a cross member joining said side members interjacent said end members, a series of sinuous springs each having an arched load supporting portion and reversely bent end portions, means for securing said reversely bent end portions in fixed relation to said cross member, a flexible border wire of substantially the shape of said frame member having end portions joined by side portions, a series of sinuous spring strips secured across the end portions of said resilient border wire, said spring strips being aligned with and resting on the spring strips secured to the base frame with the border wire spaced therefrom and substantially aligned therewith, and means for securing the aligned spring strips together in fixed relation to each other, said cross member having a central portion in the plane of the base frame and a portion at each edge thereof disposed at an angle thereto so as to lie in the plane of the reversely bent end portions of the springs secured thereto.

4. In a spring cushion construction, a base frame having end members joined by side members, spaced rows of spring supporting clips joining said side members intermediate said end members, a series of sinuous springs each having a downwardly arched load supporting portion and reversely bent end portions extending therebeneath, the ends of said end portion being secured by said spaced rows of clips, a sinuous spring strip disposed in aligned relation to each said arched load supporting portion, and a border wire joining the ends of said last sinuous spring strips and supported thereby in spaced relation to the base frame.

5. In a spring cushion construction, a base frame having end members joined by side members, spaced rows of spring supporting clips joining said side members intermediate said end members, a series of sinuous springs each having a downwardly arched load supporting portion and reversely bent end portions extending therebeneath, the ends of said end portion being secured by said spaced rows of clips, a plurality of lengths of sinuous spring strips, a flexible frame supporting the last said spring strips in spaced relation, and means for securing each said strip to one of said arched load supporting portions for supporting the flexible frame in spaced relation to said base frame.

(References on following page)

References Cited in the file of this patent

UNITED STATES PATENTS

| | | |
|---|---|---|
| 2,239,062 | Tallmadge | Apr. 22, 1941 |
| 2,284,108 | Thomas | May 26, 1942 |
| 2,316,628 | Schaffner | Apr. 13, 1943 |
| 2,341,015 | Blumensaadt et al. | Feb. 8, 1944 |
| 2,364,499 | Wolofski | Dec. 5, 1944 |
| 2,366,607 | Freeman | Jan. 2, 1945 |
| 2,384,191 | Neely | Sept. 4, 1945 |
| 2,526,184 | Williams et al. | Oct. 17, 1950 |
| 2,526,250 | Matthaei | Oct. 17, 1950 |
| 2,591,185 | Neely | Apr. 1, 1952 |